(12) United States Patent
Garcia et al.

(10) Patent No.: US 8,489,088 B2
(45) Date of Patent: Jul. 16, 2013

(54) RELIABILITY OF INFORMATION EXCHANGED AMONG ACCESS NODES

(75) Inventors: Luis Garcia, Aalborg (DK); Frank Frederiksen, Klarup (DK); Klaus Ingemann Pedersen, Aalborg (DK)

(73) Assignee: Nokia Siemens Networks Oy, Espoo (FI)

( * ) Notice: Subject to any disclaimer, the term of this patent is extended or adjusted under 35 U.S.C. 154(b) by 79 days.

(21) Appl. No.: 13/065,742

(22) Filed: Mar. 28, 2011

(65) Prior Publication Data

US 2012/0252437 A1 Oct. 4, 2012

(51) Int. Cl.
*H04W 24/00* (2009.01)

(52) U.S. Cl.
USPC ............ 455/423; 455/447; 370/328; 370/338

(58) Field of Classification Search
USPC .......................... 455/423, 447; 370/328, 338
See application file for complete search history.

(56) References Cited

U.S. PATENT DOCUMENTS

| 7,991,089 | B2 * | 8/2011 | Nakahara et al. | 375/346 |
| 8,260,207 | B2 * | 9/2012 | Srinivasan et al. | 455/63.1 |

FOREIGN PATENT DOCUMENTS

WO    WO 2010/136073 A1    12/2010

OTHER PUBLICATIONS

Nokia Siemens Networks et al., 3GPP TSG RAN WG1 #60 Meeting, R1-101450, "Uplink Performance of Autonomous CC selection", San Francisco, United States, Feb. 2010, 5 pages.
3rd Generation Partnership Project; Technical Specification Group Radio Access Network; Evolved Universal Terrestrial Radio Access Network (E-UTRAN); X2 application protocol (X2AP) (Release 9), 3GPP TS 36.423 V9.5.0, Dec. 2010, 121 pgs.
"Use of Background Interference Matrix for Autonomous Component Carrier Selection for LTE-Advanced", Nokia Siemens Networks, 3GPP TSG RAN WG1 #55-bis Meeting, R1-090235, Jan. 12-16, 2009, 7 pgs.
"Support of wider bandwidth for Home eNodeB in LTE-Advanced", Alcatel Shanghai Bell, 3GPP TSG-RAN WG1 #55, R1-084125, Nov. 10-14, 2008, 5 pgs.
"Algorithms and results for autonomous component carrier selection for LTE-Advanced", Nokia Siemens Networks, 3GPP TSG RAN WG1 #55 Meeting, R1-084321, Nov. 1-14, 2008, 5 pgs.
"Autonomous Component Carrier Selection" Interference Management in Local Area Environments for LTE-Advanced, Luis G. U. Garcia, et al., IEEE Communications Magazine, Sep. 2009, pp. 110-116.
"Ionization Yield of Radiations, II. The Fluctuations of the Number of Ions", U. Fano, Physical Review, vol. 72, No. 1, Jul. 1, 1947, pp. 26-29.

\* cited by examiner

*Primary Examiner* — Amancio Gonzalez
(74) *Attorney, Agent, or Firm* — Harrington & Smith

(57) ABSTRACT

Wireless channel interference information is determined (e.g., a background interference matrix BIM constructed from multiple user equipment measurements). Reliability of the interference information is classified and sent with the interference information to a neighbor network access node such as a HeNB. In various embodiments there are three layers of reliability, the above being the first. The second layer utilizes variability of a plurality of such reliability indications received from the same neighbor HeNB, which is updated as new interference information and reliability indications are received from that same neighbor HeNB. The third layer utilizes a peer review/update process on the neighbor HeNBs themselves, where each HeNB's performance is shared among all and updated by one another as different HeNBs utilize one another's BIM and assesses how reliably it reflected actual interference conditions. This addresses concerns for data/source reliability since communication interfaces among HeNB groups may not be controlled by a single network operator.

20 Claims, 5 Drawing Sheets

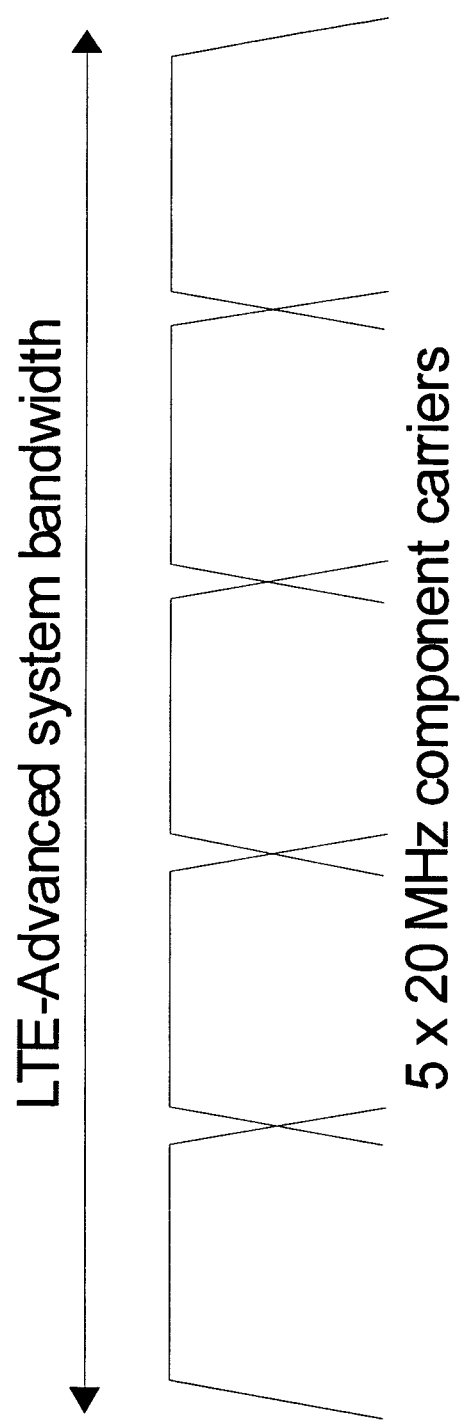
Figure 1B: Prior Art

RELIABILITY OF INFORMATION EXCHANGED AMONG ACCESS NODES

TECHNICAL FIELD

The exemplary and non-limiting embodiments of this invention relate generally to wireless communication systems, methods, devices and computer programs and, more specifically, relate to assessing and reporting reliability or trustworthiness of information such as spectrum measurement reports shared among network access nodes.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
ACCS autonomous component carrier selection
BIM background interference matrix
C/I carrier interference ratio
DL downlink (eNB to UE)
eNB Node B/base station of an LTE system
LTE long term evolution (evolved UTRAN)
MM/MME mobility management/mobility management entity
UL uplink (UE to eNB)
UTRAN universal terrestrial radio access network Heterogeneous networking (HetNet) involves the use of smaller cells/access nodes operating in functional cooperation with conventional macro (cellular) cells/access nodes and in overlapping geographical and frequency space. Adjacent cells cooperate to achieve more efficient use of scarce radio resources even if they are different wireless systems. Such smaller cells may variously be termed micro cells, pico cells, femto cells and home eNBs. For example, there may be femto-cells, sometimes termed home base stations HeNBs operating over a very limited geographic area, existing side by side with other femto-cells and with traditional network-operated cellular base stations/eNBs. These femto cells may cooperate to mitigate interference with one another, or at least to positively limit their own interference to adjacent cells to avoid the greedy cell scenario in which one cell occupies more bandwidth resources than its traffic justifies, at the expense of an adjacent cell.

The generalized HetNet concept is shown at FIG. 1A. At the left are illustrated conventional or macro eNBs 101-103 each covering idealized hexagonal cell boundaries, and at the right is the expanded inset additionally showing femto cells 120-123. Typically the femto cells operate over a smaller geographic area than the macro cells but due to proximity to cell edges their communications may interfere with one or more macro cells as well as one or more femto cells. By example, transmissions to or from femto access node 121 may interfere with macro eNB 103 and femto access node 123 despite both of those lying in the neighboring macro cell.

FIG. 1B illustrates the concept of carrier aggregation CA in LTE Release 10. The whole system bandwidth (e.g., 100 MHz) is divided into a plurality of component carriers CCs. Each macro eNB will have one CC as primary and may take other CCs into use in the cell given its traffic conditions. Such other CCs are termed secondary or extension CCs, and may or may not be backward compatible with legacy UEs which operate in the LTE Release 8/9 systems. If the femto HeNBs are also to employ the CA concept, it is expected they also will have one primary CC and potentially additional secondary/extension CCs as their own traffic needs dictate.

It is anticipated that each femto cell will maintain a background interference matrix (BIM) which expresses the interference coupling with surrounding cells. Details of the BIM concept may be seen at document R1-090235 by Nokia and Nokia Siemens Networks entitled: USE OF BACKGROUND INTERFERENCE MATRIX FOR AUTONOMOUS COMPONENT CARRIER SELECTION FOR LTE-ADVANCED (3GPP TSG RAN WG1 #55-bis Meeting; Ljubljana, Slovenia; 12-16 Jan. 2009), as well as at co-owned U.S. patent application Ser. No. 13/036,464 entitled ENHANCED ESTIMATION OF UPLINK INTERFERENCE COUPLING (filed on 28 Feb. 2011). The BIM is built locally by each eNB based on measurements from the user terminals that are served by that same eNB. Depending on the BIM and the offered traffic per cell, each eNB will autonomously select the component carriers it needs, while at the same time ensuring that it does not create excessive interference in the surrounding eNBs. The BIM can also be used to ensure that the performance in the host cell (macro eNB) is acceptable.

There is an autonomous component carrier selection scheme ACCS which the femto eNBs are to use for interference management, and the ACCS instructs the eNBs how to construct and how to utilize the BIMs. The ACCS is detailed more fully at a paper by L. Garcia, K. I. Pedersen, P. E. Mogensen entitled AUTONOMOUS COMPONENT CARRIER SELECTION: INTERFERENCE MANAGEMENT IN LOCAL AREA ENVIRONMENTS FOR LTE-ADVANCED (IEEE Communications Magazine, September 2009). To optimize system performance utilizing the ACCS and the BIM concepts in local area environments must take into account the dense deployment of low power eNBs such as the femto cells/HeNBs noted above in such local environments.

One important distinction of neighboring femto eNBs as compared to neighboring macro eNBs is that the dedicated X2 interface which interconnects the macro eNBs is fully under control of the same operator. Additionally, there are relatively few macro eNB manufacturers and so interoperability issues are more readily resolved. Such homogeneity may not be present in the HetNet environment. There, the different access nodes may be from many different manufacturers and operating under control of different operators or no centralized operator at all, and so an information exchange or other cooperation among them is decentralized rather than hierarchical and the communication interfaces between a group of neighboring femto eNBs may not be under control of any single operator. As a consequence one HeNB has little or no assurance that the BIM it receives from a neighbor HeNB is 'good', and the quality of the data in the different BIMs a given HeNB receives from multiple neighbor HeNBs may vary widely.

The emergence of decentralized packet switched cellular networks therefore introduces a new communication paradigm for network-level and even device-level (e.g., direct device-to-device communications) coordination, and this decentralization trend is expected to continue. Decisions made on collected information can no longer assume the reliability of the information, nor can it be assumed that similar-type information collected from different sources has equal reliability. This impacts the quality of the decisions themselves, such as the decision based on the BIMs received from neighbor cells whether to take a secondary/extension CC into use. These teachings address the above changing paradigm by providing a means by which various communicating entities can assess data reliability (e.g., genuineness or accuracy) more individually rather than rely on assumptions which are invalid for a non-hierarchical wireless communication system.

SUMMARY

In accordance with a first aspect of the invention there is provided an apparatus comprising a memory storing a program of computer instructions and at least one processor. In this embodiment the memory and the program of computer instructions are configured with the at least one processor to cause the apparatus to at least: determine wireless channel interference information; and classify reliability of the determined wireless channel interference information for sending with the wireless channel interference information to a neighbor network access node.

In accordance with a second aspect of the invention there is provided a method comprising: determining by an apparatus wireless channel interference information; and classifying by the apparatus reliability of the determined wireless channel interference information for sending with the wireless channel interference information to a neighbor network access node.

In accordance with a third aspect of the invention there is provided a memory storing a program of computer instructions. In this embodiment the program comprises: code for determining wireless channel interference information; and code for classifying reliability of the determined wireless channel interference information for sending with the wireless channel interference information to a neighbor network access node.

BRIEF DESCRIPTION OF THE DRAWINGS

FIG. 1B is a conceptual diagram of a carrier aggregation system for LTE-Advanced, taken from document R1-090235 referenced in the background section.

DETAILED DESCRIPTION

Figure 1A:
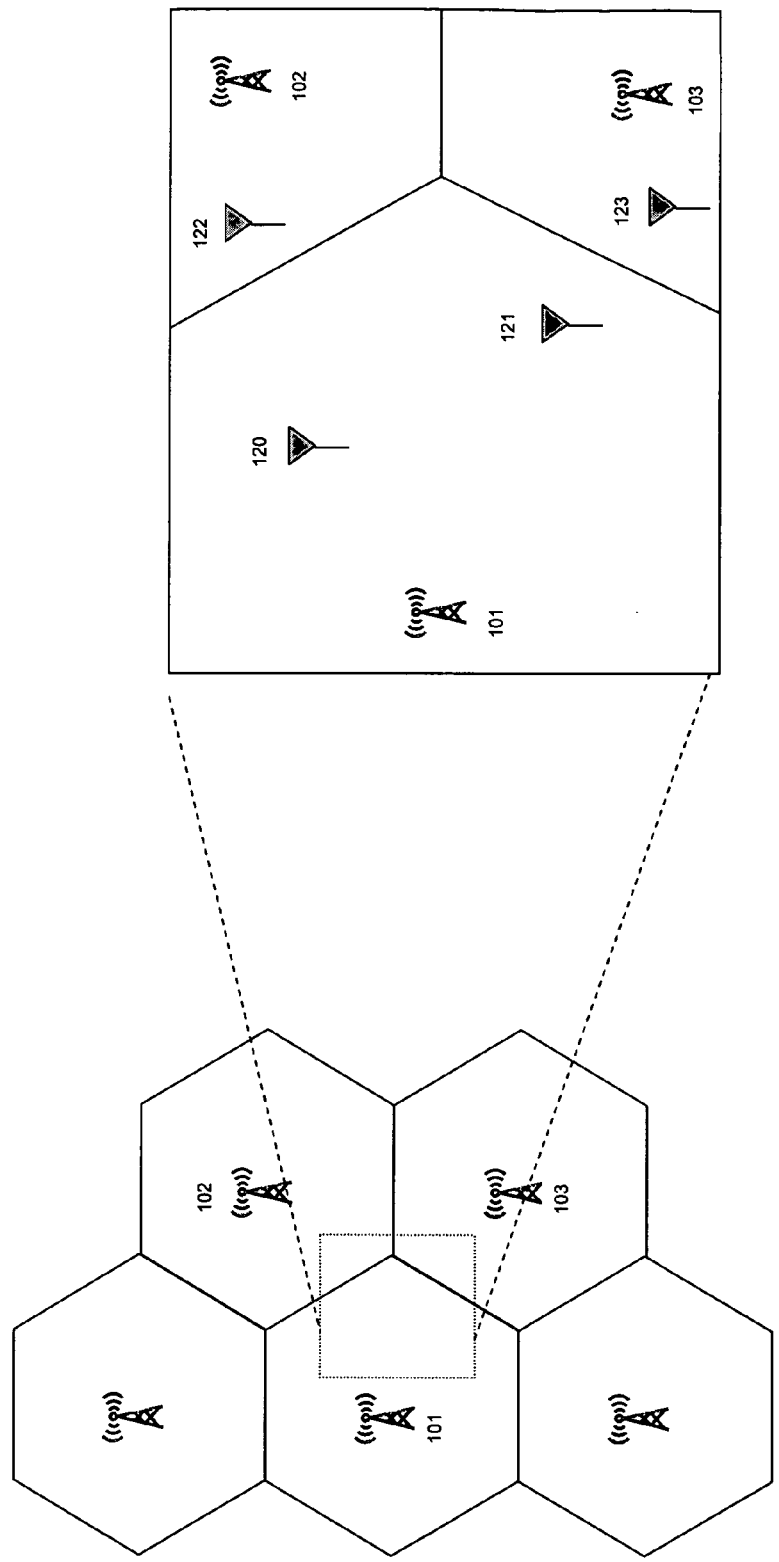
FIG. 1A is a schematic diagram illustrating an exemplary environment in which embodiments of the invention may be practiced to advantage.

In accordance with an exemplary embodiment of the invention there is a simple, yet efficient, method for a recipient of wireless network data to assess some metric of reliability for that data. This is particularly valuable for data which is exchanged among cells in a network such as those without a dedicated X2 or similar interface between them, such as but not limited only to the femto cells/HeNBs noted above. While the underlying data is wireless network data, the exchange of that data may be over wireline connections such as Ethernet cabling into a conventional Internet backbone which interconnects the various HeNBs.

The reliability in these embodiments gives the recipient a quantitative measure of trustworthiness concerning the source of that data (e.g., the sending HeNB) and the data itself, not the transmission medium over which the data is sent. Note that the reliability as employed here is in its broader sense (dependability, trustworthiness), not necessarily limited to its traditional engineering definition which relates to failure rates (i.e., probability that a device will perform its intended function during a specified period of time under stated conditions).

According to an embodiment of the invention, the sending entity/HeNB associates a reliability metric to the information which is exchanged among the various cells in a network. As will be seen, this reliability metric may be further used to further classify the known neighboring cells, such as for example rogue, reliable and friendly. For specific implementations related to the above-referenced ACCS, a reliability indicator or metric may be associated to the BIM information, which describes the interference coupling in terms of carrier to interference ratios (C/I).

Generally, the building block of a BIM gathered locally by each HeNB is the downlink measurement report carried out by its served UEs. Due to mobility, cell load and the expected difference in terms of quality of UEs and LTE modems, such measurements are expected to vary quite a lot in terms of accuracy. Conventionally the HeNB collects the DL measurements which are reported by the various UEs under its control and constructs the BIM from these plural DL observations. In one embodiment the BIM shared with the other HeNBs reflects the UL view of the channel, which may be identical to the DL BIM the HeNB creates from the DL reports directly or the UL BIM may be calculated from the DL BIM to avoid some assumptions necessary for the direct DL-to-UL BIM substitution. Each BIM preferably incorporates information about outgoing interference (interference that transmissions in the HeNB's own cell causes to other neighbor cells) as well as about incoming interference (interference seen in the HeNB's own cell from transmissions in other neighbor cells). In various embodiments the BIM shared by the HeNB may be the DL BIM (preferable), the UL BIM, or both; and incorporates outgoing interference, incoming interference or preferably both. In one embodiment the BIM shared with peer HeNBs is the raw DL interference data reported by the various UEs to the HeNB, which the HeNB then conveniently assembles for communication as a whole. In this case the UL BIM is simply estimated locally at the HeNB receiving the DL BIM with the reliability metric(s).

Following is a specific embodiment in which the reliability indication is used in a three-layer hierarchy among the peer HeNBs which share BIMs among themselves, each HeNB calculating its own BIM. Each level may be considered independently as well, but the description utilizes them all.

The first reliability layer may be considered an intra-HeNB reliability. The HeNB constructs the BIM and associates with it a reliability indication which the HeNB calculates, such as from the DL measurement reports which the HeNB used to compile the BIM. In this manner each HeNB classifies the information gathered from its served UEs before passing it on to its neighboring cells. The reliability could be calculated, for example, based on descriptive statistics.

One exemplary but non-limiting such descriptive statistics have come to be known as a Fano factor, after the author Ugo Fano of the paper entitled: IONIZATION YIELD OF RADIATIONS. II. THE FLUCTUATIONS OF THE NUMBER OF IONS (*Physical Review* 72:

26; 1947). Fano factors applied to a BIM or more generally to channel interference measurements can be considered to be analogous to a noise-to-signal ratio; a measure of the reliability with which the random variable could be estimated from a time window that on average contains several random events. In this first reliability layer then the BIM reports exchanged between the neighboring cells will consist of two element sets: (i) the raw BIM information; and (ii) an associated set of reliability estimates that follow a well-defined rule and/or definition.

Specifically, a Fano factor is a measure of the dispersion of a probability distribution. The Fano factor is defined as $$F = \frac{\sigma_W^2}{\mu_W},$$

where $\sigma_W^2$ is the variance and $\mu_W$ is the mean of a random process in a given time window W. If the time window is chosen to be infinity, the Fano factor is similar to the variance to mean ratio which is also known as the index of dispersion.

The second reliability layer may be considered an inter-HeNB reliability. Since the various HeNBs such as are shown at FIG. 1 are not necessarily under control of the same operator it is highly likely that many neighbor HeNBs may come from different manufacturers or vendors, not unlike two WiFi access nodes in two neighboring residential homes or unaffiliated businesses. As such any group of neighbor HeNBs may exhibit a wide range of capabilities in terms of measuring, collecting and fusing data, some of which will carry over to the BIMs they send to their neighbors. Moreover, for the case in which different operators decide to share the spectrum allocated to femto cells, quantifying and checking the reliability of information received from cells belonging to a different operator might be highly desirable.

This is where the second level of reliability, which may be understood as an extension of the first level, provides the greatest advantage. In this second reliability level each HeNB assesses locally the reliability of the individual neighbors which have sent various BIMs over time. Stated generally, the node reliability may be considered a performance metric, and may be a quantitative value or it may be expressed as a classification (e.g., good, marginal, rogue) of the node to which the performance metric applies. By example, such a performance metric results from each HeNB assessing the variability of the data it receives from individual neighbor HeNBs, as opposed to relying entirely on the presumable Intra-HeNB verification performed by the neighboring cell on the data which it sends itself. Or it may result from the experience of the metric-generating node (the rater node) in utilizing the BIM reported by the node to which the metric applies (the ratee node); if the BIM indicated little channel interference and good reliability but the rater node soon has to abandon a new component carrier it took into use based on that BIM, the rater node may generate a less than satisfactory performance metric for the ratee node. If the intra-HeNB reliability of the first layer is a self-assessment of reliability (sender-side assessment/processing of data), this inter-HeNB reliability may be considered as verification of a neighbor's reliability (receiver-side verification/processing of data). To avoid confusing terminology we refer to this second level assessment as a performance metric specific to an individual node. Similarly, the Fano factor can serve this function well also, either considering statistics across historical BIMs reported by that same neighboring cell or across the set of first-layer Fano factors associated with the single BIM currently being reported or based on experience of the rater node in utilizing one or more BIMs from the same ratee node.

The third reliability layer may be considered an inter-HeNB cooperation reliability, where the performance metric specific to an individual HeNB is subject to group-wide assessment by the peer neighbor HeNBs. This third reliability layer involves a peer-to-peer mechanism for disseminating the performance metrics specific to the various HeNBs which are each generated also by the neighbor HeNBs, and can either reinforce or correct the knowledge about a given cell/HeNB. As the peer review of a given HeNB trends to a stable performance metric (i.e., few observations tend to a wider variance than many observations over time), eventually this third reliability level can be used as a basis to implement a punishment/rewarding mechanism of identified rogue/friendly cells respectively. The rogue/friendly peer performance rating/indication may be applied on an individual HeNB basis, or may be expanded to a specific brand/manufacturer or model number in case the different manufacturing implementations of BIM collection and construction is widely different and inferior or superior for one manufacturer/model as compared to the majority of others.

Figure 2:
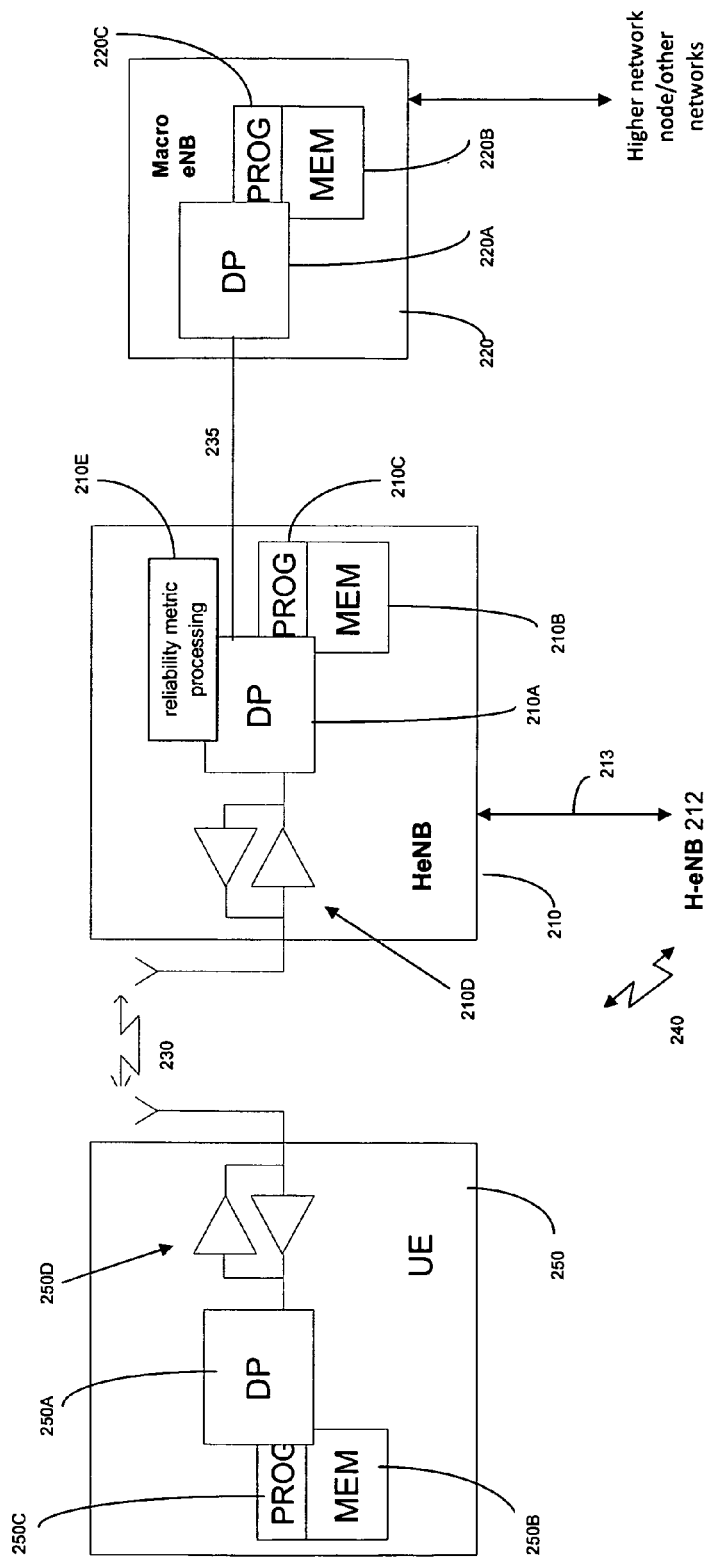
FIG. 2 shows a simplified block diagram of certain apparatus according to various exemplary embodiments of the invention.

Reference is now made to FIG. 2 for illustrating a simplified block diagram of various electronic devices and apparatus that are suitable for use in practicing the exemplary embodiments of this invention. In FIG. 2 an apparatus such as a mobile communication device which above is referred to as a UE 250 is in communication over a wireless link 230 with a network access node, such as a femto cell/HeNB 210. The UE 250 includes a controller, such as a computer or a data processor (DP) 250A, a computer-readable memory medium embodied as a memory (MEM) 250B that stores a program of computer instructions (PROG) 250C, and a suitable radio frequency (RF) transmitter and receiver 250D for bidirectional wireless communications with the HeNB 210 via one or more antennas. The UE 250 is one of several under control of the HeNB 210, each UE configured to measure interference on a wireless channel and report same to the HeNB 210 on the wireless link 230. Such interference may arise from transmissions to or from the neighbor HeNB 212 on the wireless link 240.

The HeNB 210 also includes a controller, such as a computer or a data processor (DP) 210A, a computer-readable memory medium embodied as a memory (MEM) 210B that stores a program of computer instructions (PROG) 210C, and a suitable RF transmitter and receiver 210D for communication with the UE 250 via one or more antennas. The HeNB 210 is coupled to a macro eNB 220 via a data/control path 235 which may be an Internet connection rather than a dedicated link such as the conventional X2 interfaces between macro eNBs in the LTE system. The HeNB 210 may also be coupled to each of several neighbor HeNBs 212 via data/control path 213, which may also be implemented as an internet connection. The neighbor HeNBs 212 may be functionally constructed as is the illustrated HeNB 210

The macro eNB 220 may also include a DP 220A, a MEM 220B storing a PROG 220C not unlike those shown for the HeNB 210, and it may also have a receiver and transmitter (not shown). The macro eNB 220 is also coupled to a higher network node (e.g., a network control element NCE 14 that may include the MME/Serving Gateway functionality typical in LTE systems) which provides connectivity with a network, such as a telephone network and/or a data communications network (e.g., the internet).

At least one of the PROGs 210C is assumed to include program instructions that, when executed by the associated DP 210A, enable the device to operate in accordance with the exemplary embodiments of this invention, as discussed above and further below with reference to FIG. 3.

That is, the exemplary embodiments of this invention may be implemented at least in part by computer software executable by the DP 210A of the HeNB 210, or by hardware, or by a combination of stored software and hardware (and/or stored firmware).

For the purposes of describing the exemplary embodiments of this invention the HeNB 210 may be assumed to also include a reliability metric processing block or function which is configured to create the Fano factor or other reliability metric as detailed herein for the BIM or other such channel information as may be circulated and shared among the various HeNBs 212 and macro eNBs 220. Such a function may be implemented as a processor (either the DP 201A or separate therefrom), or stored software/firmware as noted above.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 210B and 250B, 220B may be of any type suitable to the local technical environment and may be implemented using any suitable data storage technology, such as semiconductor based memory devices, flash memory, magnetic memory devices and systems, optical memory devices and systems, fixed memory and removable memory. The DPs 210A, 250A and 220A as well as the reliability metric processing block 210E (if implemented as a processor separate from the DP 210A) may be of any type suitable to the local technical environment, and may include one or more of general purpose computers, special purpose computers, microprocessors, digital signal processors (DSPs) and processors based on a multicore processor architecture, as non-limiting examples.

Figure 3:
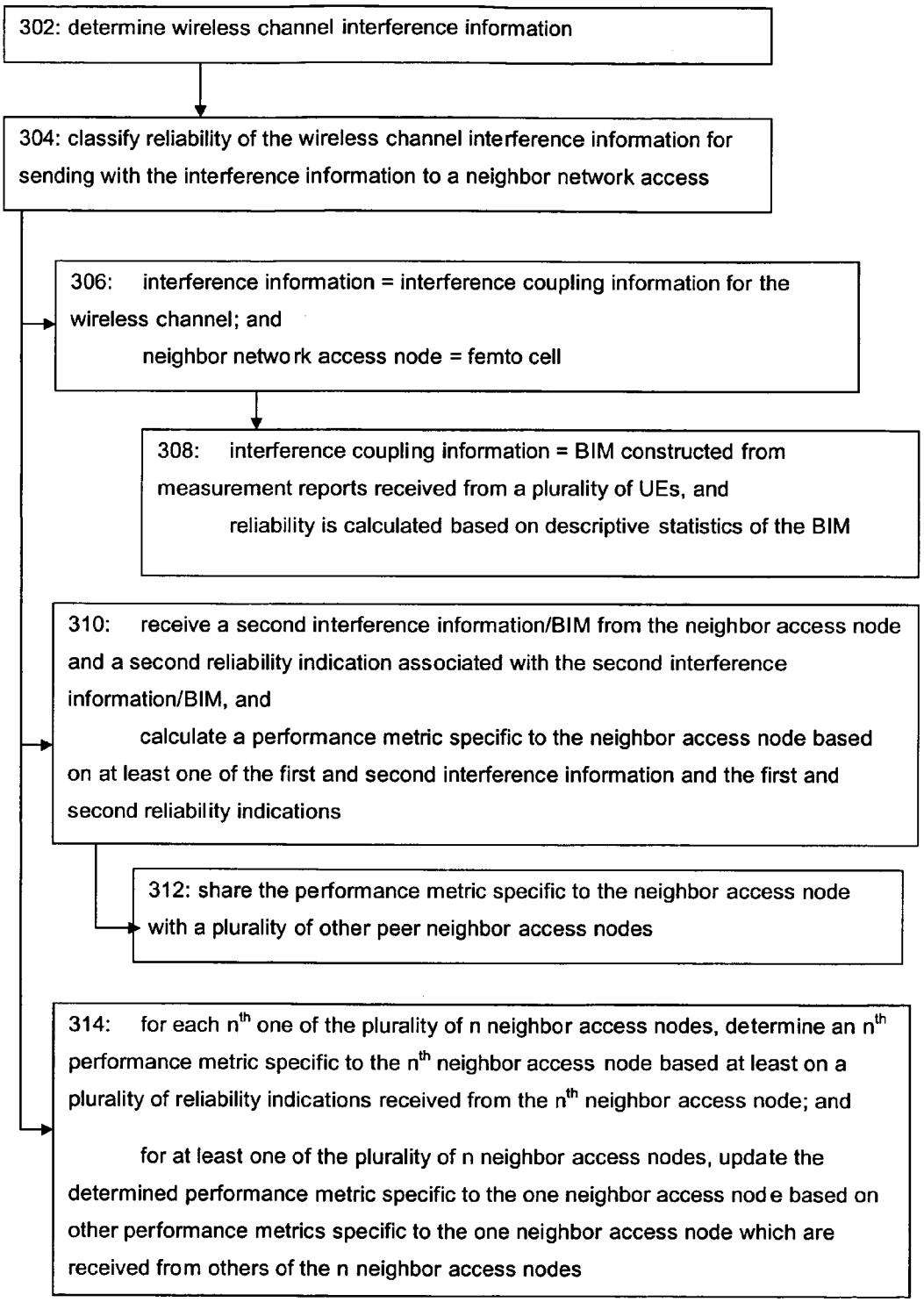
FIG. 3 is a logic flow diagram that illustrates the operation of a method, and a result of execution of computer program instructions embodied on a computer readable memory, in accordance with an exemplary embodiment of this invention.

FIG. 3 is a logic flow diagram that illustrates the operation of a method, and a result of execution of computer program instructions, in accordance with the exemplary embodiments of this invention from the perspective of a network element such as for example the HeNB/network access node/femto node. FIG. 3 may also be reflective of certain components of such a HeNB 210. In accordance with these exemplary embodiments at block 302 the apparatus or device or femto network node determines wireless channel interference information, and block 304 the apparatus classifies reliability of the determined wireless channel interference information for sending with the wireless channel interference information to a neighbor network access node. By example, the reliability may be classified as a quantitative metric such as one or a set of Fano factors for the channel information/BIM. The wireless channel may span an entire component carrier or something less. By the above examples the determining at block 304 is done by the femto node itself as noted at block 306 below.

Additional blocks of FIG. 3 illustrate various specific exemplary but non-limiting embodiments detailed above, and those various blocks may be combined with one another or used individually to modify blocks 302 and/or 304.

Specifically, block 306 specifies that the wireless channel interference information comprises (incoming and outgoing) interference coupling information for the wireless channel and the neighbor network access node comprises a femto cell. Block 306 is further detailed at block 308 which specifies the interference coupling information comprises a background interference matrix constructed from measurement reports received from a plurality of user equipments, and that the reliability is calculated based on descriptive statistics of the background interference matrix. As detailed above this reliability relates to the BIM itself and may be implemented as one or more Fano factors associated with each BIM.

Block 310 refers to any of the above portions of FIG. 3, and refers to the second reliability level noted above and expressed as a performance metric. There, the HeNB which created the BIM and which classifies its own BIM reliability additionally receives from the same neighbor access node to which the HeNB sent its own BIM and reliability indication a second BIM and a second reliability indication(s) from that neighbor access node. The original HeNB then calculates and stores in its local memory a performance metric specific to the neighbor access node, and that performance metric is based on one or both of the second interference information and the second reliability indication. By example, the performance metric may consider variability across multiple reliability indicators for multiple BIMs from the same neighbor HeNB, or it may consider variability across a set/plurality of Fano factors/reliability indicators associated with only a single BIM, or it may be on the original HeNB's experience in utilizing the neighbor HeNB's BIM(s) relative to the neighbor HeNB's self-reported reliability'indications.

Block 312 further modifies block 310 in that the subject HeNB shares the calculated performance metric, which is specific to that single neighbor HeNB of block 310, with a plurality of other peer neighbor access nodes in accordance with the second reliability layer noted above.

Figure 4:
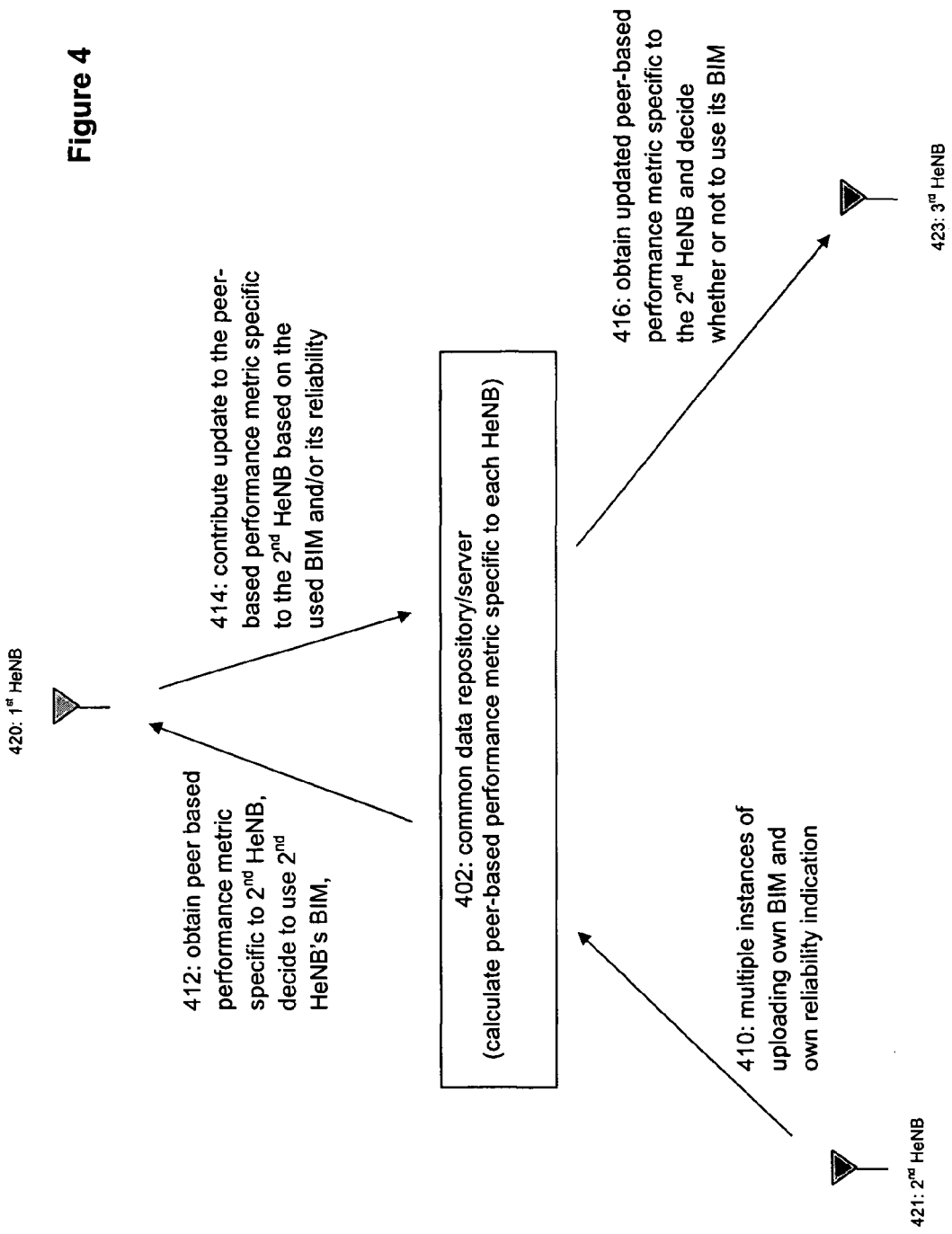
FIG. 4 is a schematic diagram illustrating signaling among various HeNBs for sharing variability of the reliability of individual HeNB's BIM reports according to an exemplary embodiment of the invention.

Block 314 reflects the third reliability layer, and may further modify block 310 or may be independent therefrom. If we consider the neighbor access node of block 304 to be just one of a plurality of n neighbor HeNBs which are individually identified/indexed as an $n^{th}$ HeNB, then at block 314 the subject HeNB determines for each $n^{th}$ neighbor access node an $n^{th}$ performance metric specific that is to the $n^{th}$ neighbor access node and which is based at least on a plurality of reliability indications received from the $n^{th}$ neighbor access node. Each of those performance metrics classifies reliability of the $n^{th}$ node respecting the various interference information it reported. Still at block 314 the same subject HeNB then, for at least one of the plurality of n neighbor access nodes, updates the performance metric specific to the one neighbor access node based on other performance metrics specific to the one neighbor access node which are received from others of the n neighbor access nodes. Preferably the subject HeNB does this for each of the neighbor nodes, and so the subject HeNB gets all the peer nodes' performance metrics for that one neighbor node. The subject neighbor node also sends the performance metric it determined for the one neighbor node to the other neighbor nodes, thereby sharing with its peers the metric it calculated on the one neighbor node. FIG. 4 below more particularly describes block 314.

The various blocks shown in FIG. 3 may be viewed as method steps, and/or as operations that result from operation of computer program code, and/or as a plurality of coupled logic circuit elements constructed to carry out the associated function(s).

FIG. 4 is a schematic diagram further illustrating signaling among various HeNBs for sharing and for updating the performance metrics of individual HeNB's which are based on their BIM reports according to block 314 of FIG. 3 above. The subject HeNB is the first HeNB 420, there is a second HeNB 421 and a third HeNB 423 which may be in the positions of the HeNBs 120, 121 and 123 of FIG. 1. At FIG. 4 the second HeNB 421 uploads 410 to a common data repository 402, such as a server accessible to the various HeNBs via the Internet, its BIM and associated reliability indication(s). Over time various BIMs and reliability indications are uploaded by the second HeNB 421, which the data repository 402 stores for access by the various neighbor HeNBs. The data repository 402 may also calculate a peer-based performance metric based on the various BIMS and/or reliability indications as updated by the various other neighbor HeNBs. In the FIG. 4 description the performance metric is specific only to the second HeNB 421.

The first HeNB 420 then accesses the data repository 402 to obtain the BIM and reliability indication which was uploaded by the second HeNB 421, and may also determine or otherwise obtain at 412 the peer-based performance metric specific to the second HeNB 421. The first HeNB 420 then uses that peer-based performance metric to assess how reliable is the BIM reported by the second HeNB 421 and based on that information decides to take a component carrier into use. By way of example, assume the first HeNB 420 soon must abandon its use of that newly configured component carrier due to excessive interference despite the second HeNB's BIM indicating little interference present there, and so at 414 the first HeNB 420 contributes the performance metric that the first HeNB 420 determines or otherwise calculates but which is specific for the second HeNB 421, as an update to the peer-based performance metric specific to the second HeNB 421 that is stored in the server 402. In this example the update to the first HeNB 420 would marginally change the peer-based performance metric to indicate a lesser reliability of the second HeNB's BIM reporting.

The third HeNB 423 then obtains at 416 this updated peer-based performance metric which is specific to the second HeNB 421 for its own use in taking a channel or component carrier into use. Each of the various HeNBs contribute their own BIMs and reliability indicators to the server 402, and submit updates to the various neighbor HeNB performance metrics that are also stored there, resulting in a peer-based review and rating system for one another. The performance metric may be implemented as a quantitative value, or as a qualitative category such as good, marginal or rogue for any given HeNB. The BIMs and reliability indicators subject to inclusion in the performance metric computation and the peer-updates thereto may be limited in time (e.g., the BIMs/reliability indications submitted or time-stamped within some recent fixed time constraint such as the past 2 hours or past one day) or limited to those within some longer time period but for similar expected traffic conditions (e.g, those submitted or time-stamped within the past week but only for weekdays between 4 and 7 pm).

In another embodiment there is no common data repository 402 though which the information is distributed but instead the communications are directly between the various HeNBs, such as over a plurality of communication interfaces which are not all under control of a single network operator. By example these may each be a dedicated X2 interface. In this embodiment each HeNB would compute the HeNB-specific performance metric itself for various HeNBs, share them across the X2 interfaces, and compute for each individual HeNB a peer-based performance metric based on its own computed metric and those received from other peer nodes. The updates shown at message 414 would be for some individual neighbor HeNB and distributed to at least the other neighbor HeNBs.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the LTE-Advanced system, it should be appreciated that the exemplary embodiments of this invention are not limited for use with only this one particular type of wireless communication system, particularly those which may not have a dedicated control link among all the various access nodes.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

The foregoing description should be considered as merely illustrative of the principles, teachings and exemplary embodiments of this invention, and not in limitation thereof.

We claim:
1. An apparatus comprising:
a memory storing a program of computer instructions; and
at least one processor;
in which the memory and the program of computer instructions are configured with the at least one processor to cause the apparatus to at least:
determine wireless channel interference information;

classify reliability of the determined wireless channel interference information; and directly send the wireless channel interference information and an indication corresponding to the classified reliability to a neighbor network access node.

2. The apparatus according to claim 1, in which the wireless channel interference information comprises interference coupling information and the neighbor network access node comprises a femto cell.

3. The apparatus according to claim 2 in which the interference coupling information comprises a background interference matrix constructed from measurement reports received from a plurality of user equipments.

4. The apparatus according to claim 3, in which the reliability is calculated based on descriptive statistics of the background interference matrix.

5. The apparatus according to claim 1, in which the determined wireless channel interference information comprises first interference information and the classified reliability is a first reliability indication, in which the memory and the program of computer instructions is configured with the at least one processor to cause the apparatus to further at least:

receive a second interference information from the neighbor access node and a second reliability indication associated with the second interference information; and calculate and store in the memory a performance metric specific to the neighbor access node based on at least one of the second interference information and the second reliability indication.

6. The apparatus according to claim 5, in which the memory and the program of computer instructions is configured with the at least one processor to cause the apparatus to further at least:

share the performance metric specific to the neighbor access node with a plurality of other peer neighbor access nodes.

7. The apparatus according to claim 1, in which the neighbor access node comprises one of a plurality of n neighbor access nodes in which n is an integer greater than one, in which memory and the program of computer instructions are configured with the at least one processor to cause the apparatus to further at least:

for each nth one of the plurality of n neighbor access nodes, determine an nth performance metric specific to the nth neighbor access node based at least on a plurality of reliability indications received from the nth neighbor access nodes, each reliability indication classifying reliability of interference information reported by the respective nth neighbor access node; and for at least one of the plurality of n neighbor access nodes, update the determined performance metric specific to the one neighbor access node based on other performance metrics specific to the one neighbor access node which are received from others of the n neighbor access nodes.

8. The apparatus according to claim 7, in which the apparatus comprises a home eNB, each of the plurality of n neighbor access nodes comprises a neighbor home eNB, and the memory and the program of computer instructions are configured with the at least one processor to cause the apparatus further to at least one of:

send the determined performance metric to the plurality of n neighbor access nodes over a plurality of communication interfaces which are not all under control of a single network operator; and upload the determined performance metric common data repository accessible by each of the plurality of n neighbor access nodes.

9. A method comprising:

determining by an apparatus wireless channel interference information;

classifying by the apparatus reliability of the determined wireless channel interference information; and directly sending the wireless channel interference information and an indication corresponding to the classified reliability to a neighbor network access node.

10. The method according to claim 9, in which the wireless channel interference information comprises interference coupling information and the neighbor network access node comprises a femto cell.

11. The method according to claim 10, in which the interference coupling information comprises a background interference matrix constructed from measurement reports received from a plurality of user equipments.

12. The method according to claim 11, in which classifying the reliability comprising calculating the reliability based on descriptive statistics of the background interference matrix.

13. The method according to claim 9, in which the determined wireless channel interference information comprises first interference information and the classified reliability is a first reliability indication, the method further comprising:

receiving a second interference information from the neighbor access node and a second reliability indication associated with the second interference information; and calculating and storing in the memory a performance metric specific to the neighbor access node based on at least one of the first and second interference information and the first and second reliability indications.

14. The method according to claim 13, in which the method further comprises:

sharing the performance metric specific to the neighbor access node with a plurality of other peer neighbor access nodes.

15. The method according to claim 9, in which the neighbor access node comprises one of a plurality of n neighbor access nodes in which n is an integer greater than one, and in which the method further comprises:

for each nth one of the plurality of n neighbor access nodes, determining an nth performance metric specific to the nth neighbor access node based at least on a plurality of reliability indications received from the nth neighbor access node, each reliability indication classifying reliability of interference information reported by the respective nth neighbor access node; and for at least one of the plurality of n neighbor access nodes, update the determined performance metric specific to the one neighbor access node based on other performance metrics specific to the one neighbor access node which are received from others of the n neighbor access nodes.

16. The method according to claim 15, in which the apparatus comprises a home eNB, each of the plurality of n neighbor access nodes comprises a neighbor home eNB, and distributing the updated variability comprises distributing via at least one of:

sending the determined performance metric to the n neighbor access nodes over a plurality of communication interfaces which are not all under control of a single network operator; and uploading the determined performance metric to a common data repository accessible by each of the plurality of n neighbor access nodes.

17. A memory storing a program of computer instructions, the program comprising:

code for determining wireless channel interference information;

code for classifying reliability of the determined wireless channel interference information; and code for directly sending the wireless channel interference information and an indication corresponding to the classified reliability to a neighbor network access node.

18. The memory according to claim 17, in which the interference information comprises a background interference matrix constructed from measurement reports received from a plurality of user equipments.

19. The memory according to claim 17, in which the determined wireless channel interference information comprises first interference information and the classified reliability is a first reliability indication,
in which the program of computer instructions further comprises:

code for calculating a performance metric specific to the neighbor access node based on a plurality of the reliability indications and/or on a plurality of interference informations.

20. The memory according to claim 19, in which the neighbor access node comprises one of a plurality of n neighbor access nodes, in which n is an integer greater than one, in which the program of computer instructions further comprises:

code, iteratively executable for each nth one of the plurality of n neighbor access nodes, for determining an nth performance metric specific to the nth neighbor access node based at least on a plurality of reliability indications received from the nth neighbor access node, each reliability indication classifying reliability of interference information reported by the respective nth neighbor access node; and for at least one of the plurality of n neighbor access nodes, code for updating the determined performance metric specific to the one neighbor access node based on other performance metrics specific to the one neighbor access node which are received from others of the n neighbor access nodes.

* * * * *